(12) United States Patent
Ferraro

(10) Patent No.: US 6,307,686 B1
(45) Date of Patent: Oct. 23, 2001

(54) POWER LENS

(76) Inventor: John C Ferraro, 1784 Sparkling Water Cir., Ocoee, FL (US) 34761

( * ) Notice: Subject to any disclaimer, the term of this patent is extended or adjusted under 35 U.S.C. 154(b) by 0 days.

(21) Appl. No.: 09/706,637

(22) Filed: Nov. 6, 2000

Related U.S. Application Data

(62) Division of application No. 09/436,176, filed on Nov. 8, 1999, now Pat. No. 6,151,172.

(51) Int. Cl.[7] ................................................... G02B 27/02
(52) U.S. Cl. ............................. 359/802; 359/809; 345/8
(58) Field of Search ............................. 345/8; 359/802, 359/809, 808, 812, 813

(56) References Cited

U.S. PATENT DOCUMENTS

| | | | |
|---|---|---|---|
| 5,130,853 | * 7/1992 | Sakurai | 359/803 |
| 5,168,405 | * 12/1992 | Feinbloom | 359/802 |
| 5,291,229 | * 3/1994 | Feinbloom | 351/57 |
| 5,784,210 | * 7/1998 | Malaspinas | 359/802 |

* cited by examiner

*Primary Examiner*—Georgia Epps
*Assistant Examiner*—Jim Thompson
(74) *Attorney, Agent, or Firm*—Michael I. Kroll

(57) ABSTRACT

The present invention (10) discloses a removably attached magnifying lens (22) which is designed for placement on display windows (14) of small devices such as are found on cellular telephones (12) and the like. The lens (22) is mounted onto an adjustable housing (20) having tabs (18) thereon for being grasped by the hand of the user (16) whereby the display window (14) can be brought into visual focus. The housing (20) can be attached to the display window (14) or to, for example, the instrument panel (38) of an airplane (40) by adhesive means 24 or a strap system (36). Also, the present invention (10) can be designed to fit variously shaped gauges (48), for example, round (46) or square (44) gauges.

16 Claims, 12 Drawing Sheets

POWER LENS

This application is a Division of Ser. No. 09/436,176 filed Nov. 8, 1999, now U.S. Pat. No. 6,151,172.

BACKGROUND OF THE INVENTION

Field of the Invention

The present invention relates generally to magnifying devices and, more specifically, to a magnification apparatus for selectively magnifying information display windows. The present invention, an attachable and detachable magnification power lens, is an apparatus which is selectively attached and/or detached by means of a strap and can be selectively semi-permanently attached to such devices as, cellular telephones, beepers, cordless telephones, airplane gauges and instruments, CB's, boat gauges and instruments, car gauges and instruments, stereo display windows, TV display windows, VCR display windows, DVD display windows, home phone displays Caller ID's displays, hospital equipment displays, electrical readouts, heart monitors, military electronic displays and gauges computer monitors, and/or any device having a display window that is difficult to read.

The magnification apparatus includes a housing containing an adjustable extension member and a plastic magnification lens. The adjustable extension member and lens may be adjusted until enlargement of the display window has been achieved. The lens tabs provide a means of orientating the magnifying lens in a spaced relationship between the users visual clarity and the object of magnification. The magnification apparatus is selectively placed, positioned and secured to a display window by means of adhesive or elastic, rubber, or leather strap.

The present invention is a means of improving the quality of visual clarity to people with poor vision and often need magnification lens to read small display windows. With the ever-expanding use of cellular phones, beepers and cordless phones with small, hard to read display windows, there is an increasing requirement for enlargement. The present invention provides a means of optical enlargement to determine the accuracy of the information displayed on the units display window.

DESCRIPTION OF THE PRIOR ART

There are other magnification device designed for improved magnification. Typical of these is U.S. Pat. No. 5,706,255 issued to Christopher B. McKay on Jan. 6, 1998.

Another patent was issued to Alan Finkelstein et al. on Mar. 4, 1997 as U.S. Pat. No. 5,608,203. Yet another U.S. Pat. No. 5,075,799 was issued to Jerrold S. Pine on Dec. 24, 1991 and still yet another was issued on May 29, 1984 to Robert C. Goode as U.S. Pat. No. 4,451,117.

U.S. Pat. No. 5,706,255

Inventor: Christopher B. McKay

Issued: Jan. 6, 1998

A time keeping and magnification device includes a watch and a magnifying lens pivotally connected to the watch. The lens may be pivoted away from the face of the watch to magnify objects. The device may include a light adjacent the magnifying lens which enables the device to be used in dark areas. Additionally, the device may contain a fastener which restricts the magnifying lens from pivoting away from the face of the watch. In the preferred embodiment of the invention, the magnifying lens may be either pivoted about the hinge or detached from the watch. In alternate embodiments of the invention, a connector removably holds the magnifying lens over the face of the watch. Furthermore, in other embodiments, the device further includes a second magnifying lens and a second hinge which cooperate with the first magnifying lens and the first hinge to form a telescope-like combination. A method for using the time keeping and magnifying device also is disclosed.

U.S. Pat. No. 5,608,203

Inventor: Alan Finkelstein

Issued: Mar. 4, 1997

A financial transaction card adapted for use in reading externally stored information includes a substantially non-foldable ridged base and a strip for carrying machine readable information. The ridged base comprises a magnifying lens.

U.S. Pat. No. 5,075,799

Inventor: Jerrold S. Pine

Issued: Dec. 24, 1991

An apparatus is described for the magnification of an information display on a selective call receiver. The apparatus comprises an optical lens system coupled in a manner which provides for its easy attachment and removal from the selective call receiver.

U.S. Pat. No. 4,451,117

Inventor: Robert C. Goode

Issued: May 29, 1984

Disclosed is a magnifying element for us with a digital watch face to magnify the numerals and hence facilitate the reading of the time thereby. The magnifying element has a face side and an adhesive coated side which is covered by tear strip whose removal exposes the adhesive side. Appropriate manipulative pressure applied to the face side of the magnifying element results in the adhesive coated side being attached to the digital watch face.

While these magnification device may be suitable for the purposes for which they were designed, they would not be as suitable for the purposes of the present invention, as hereinafter described.

SUMMARY OF THE PRESENT INVENTION

The present invention discloses a removably attached magnifying lens which is designed for placement on display windows such as are found on cellular telephones and the like. The lens is mounted onto an adjustable housing having tabs thereon for being grasped by the hands of the user whereby the display window can be brought into visual focus. The housing can be attached to the display window of a small device or to, for example, the instrument panel of an airplane by adhesive means or a strap system. Also, the present invention can be designed to fit variously shaped gauges, for example, round or square gauges.

A primary object of the present invention is to provide a magnification apparatus for magnifying information display windows.

Another object of the present invention is to provide a magnification apparatus for magnifying information display windows of cellular phones, beepers, cordless phones, airplane gauges and instruments, CB's, boat gauges and instruments, car gauges and instruments, stereo display windows, TV display windows, VCR display windows, DVD display windows, home phone displays Caller ID's displays, hospital equipment displays, electrical readouts, heart monitors, military electronic displays and gauges computer monitors, and or any display window that are difficult to read.

Yet another object of the present invention is to provide a magnification apparatus for magnifying information display windows of cellular phones, beepers, cordless phones, airplane gauges and instruments, CB's, boat gauges and instruments, car gauges and instruments, stereo display windows, TV display windows, VCR display windows, DVD display windows, home phone displays Caller ID's displays, hospital equipment displays, electrical readouts, heart monitors, military electronic displays and gauges computer monitors, and or any display window that are difficult to read. Also a magnification device with an adjustable housing and lens that will enhance or enlarge visual clarity.

Still yet another object of the present invention is to provide a magnification apparatus for magnifying information display windows of cellular phones, beepers, cordless phones, airplane gauges and instruments, CB's, boat gauges and instruments, car gauges and instruments, stereo display windows, TV display windows, VCR display windows, DVD display windows, home phone displays Caller ID's displays, hospital equipment displays, electrical readouts, heart monitors, military electronic displays and gauges computer monitors, and or any display window that is difficult to read. Also a magnification device with an adjustable housing and lens that will enhance or enlarge visual clarity, as well a device that is simple to adjust.

Yet another object of the present invention is to provide a magnification apparatus for magnifying information display windows of cellular phones, beepers, cordless phones, airplane gauges and instruments, CBs, boat gauges and instruments, car gauges and instruments, stereo display windows, TV display windows, VCR display windows, DVD display windows, home phone displays Caller ID's displays, hospital equipment displays, electrical readouts, heart monitors, military electronic displays and gauges computer monitors, and or any display window that is difficult to read. Also a magnification device with an adjustable housing and lens that will enhance or enlarge visual clarity, as well a device that is simple to adjust and easy to adapt to display windows.

Additional objects of the present invention will appear as the description proceeds.

The present invention overcomes the shortcomings of the prior art by providing a magnification apparatus for magnifying information display windows of cellular phones, beepers, cordless phones and or any display windows that are difficult to read. Also a magnification device with an adjustable housing and lens that may correct visual clarity, as well a device simple to adjust and easy to adapt to display windows. The present invention provides a means of optical clarity to determine the accuracy of the information displayed on the units display window.

The foregoing and other objects and advantages will appear from the description to follow. In the description reference is made to the accompanying drawings, which form a part hereof, and in which is shown by way of illustration specific embodiments in which the invention may be practiced. These embodiments will be described in sufficient detail to enable those skilled in the art to practice the invention, and it is to be understood that other embodiments may be utilized and that structural changes may be made without departing from the scope of the invention. In the accompanying drawings, like reference characters designate the same or similar parts throughout the several views.

The following detailed description is, therefore, not to be taken in a limiting sense, and the scope of the present invention is best defined by the appended claims.

BRIEF DESCRIPTION OF THE DRAWINGS

In order that the invention may be more fully understood, it will now be described, by way of example, with reference to the accompanying drawings in which.

LIST OF REFERENCE NUMERALS

Figure 1:
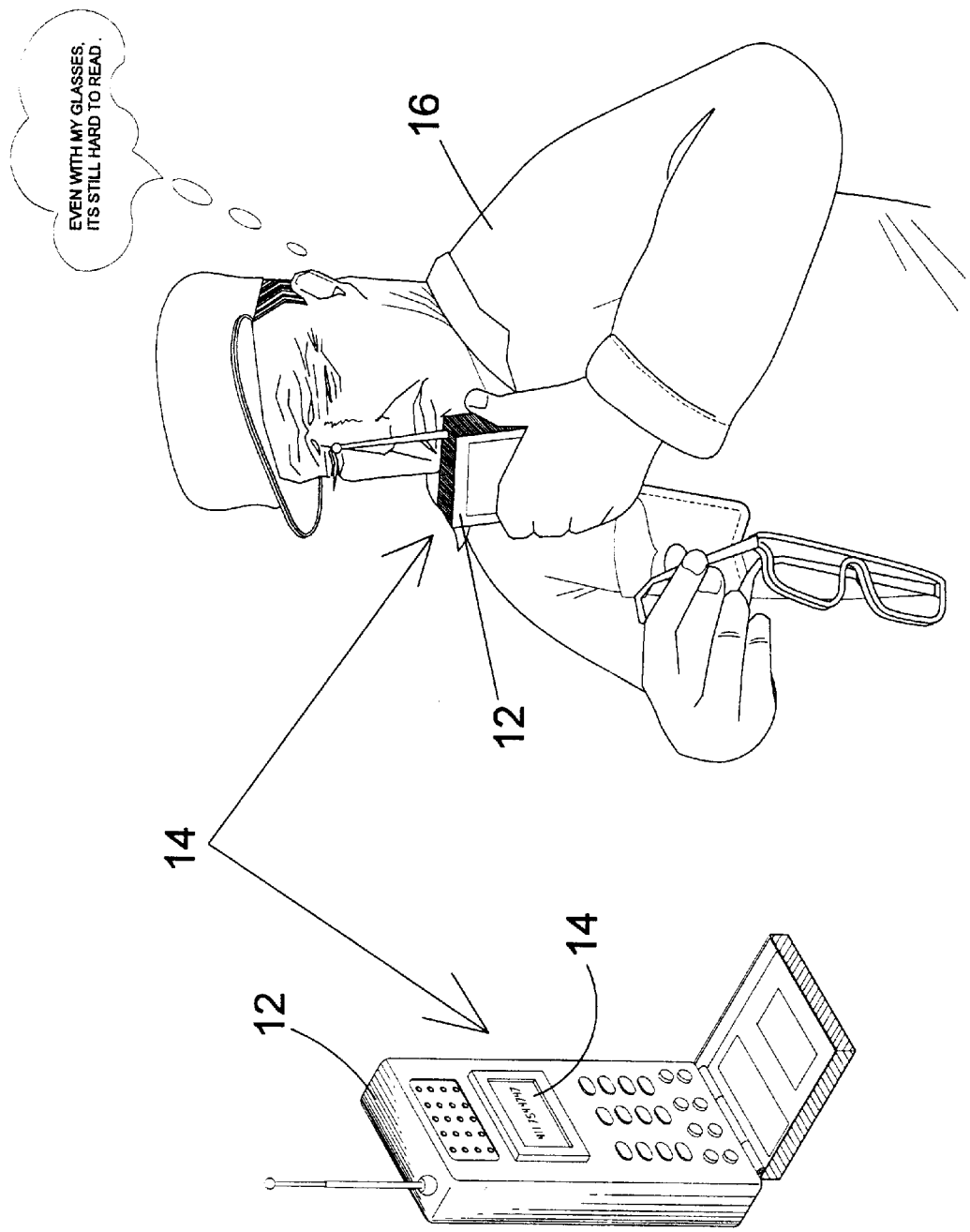
FIG. 1 is an illustrative view of a cellular phone having a display window and a user who is unable to read the information displayed on said display window. As more and more equipment is miniaturized the size of the display area is decreasing. This has resulted in the need for a device which can be installed either permanently or selectively to magnify the information displayed on said equipment.

With regard to reference numerals used, the following numbering is used throughout the drawings.

10 present invention
12 cell phone
14 display window
15 direction arrow
16 user
18 tabs
20 housing
22 lens
24 adhesive
26 strap slot
28 strap
30 clip
32 base
34 buckle
36 strap system
38 instrument panel
40 aircraft
42 pilot
44 square
46 round
48 gauge

DESCRIPTION OF THE PREFERRED EMBODIMENT(S)

In order that the invention may be more fully understood, it will now be described, by way of example, with reference to the accompanying drawings in which FIGS. 1 through 12 illustrate the present invention being a magnifying lens for display windows of small devices.

Turning to FIG. 1, shown therein is an illustrative view of a cellular phone 12 having a display window 14 and a user 16 who is unable to read the information displayed on the display window 14. As more and more equipment is miniaturized the size of the display area 14 is decreasing. This has resulted in the need for a device which can be installed either permanently or selectively to magnify the information displayed on the equipment so that a user 16 can more easily read the display 14.

Figure 2:
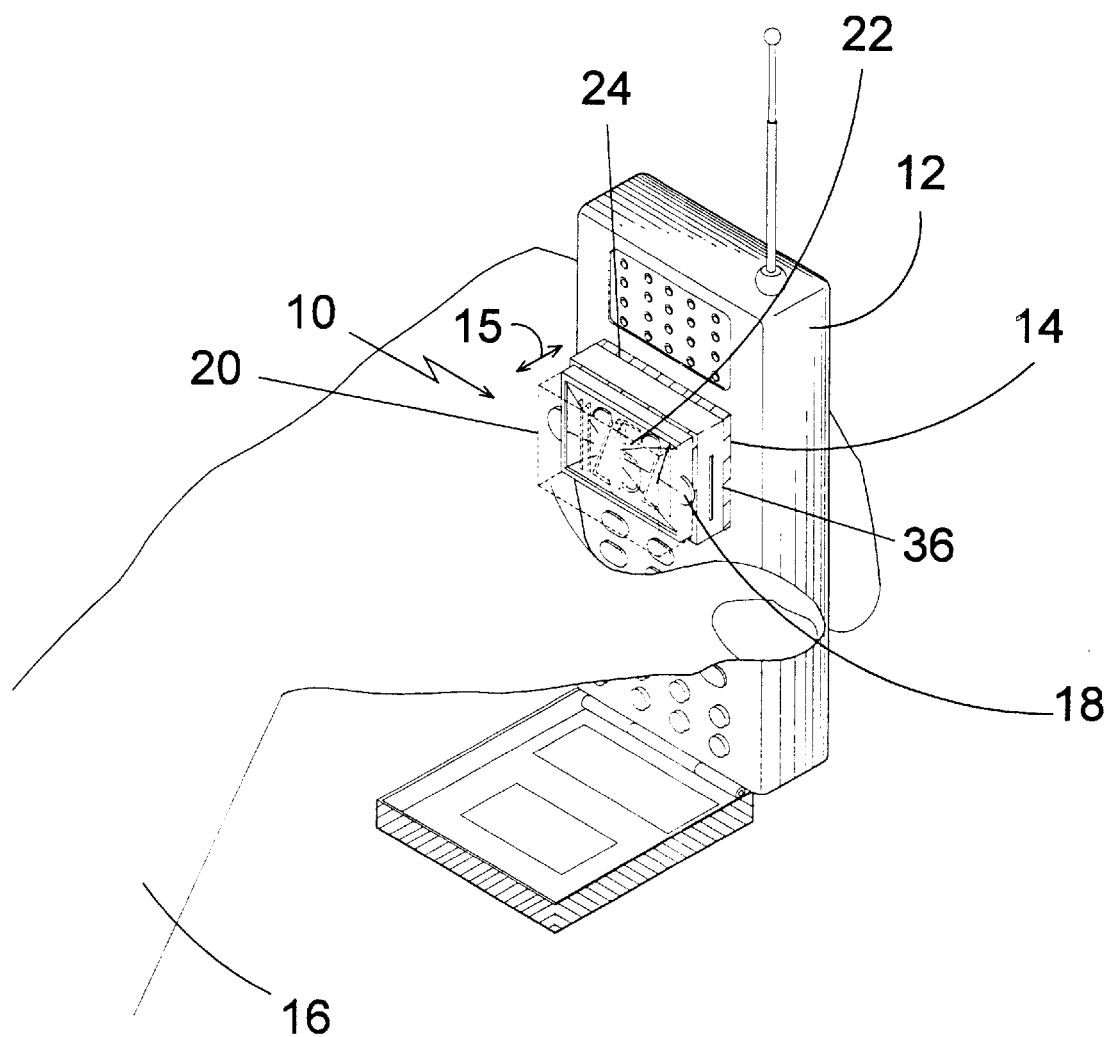
FIG. 2 is a perspective view of the present invention semi-permanently positioned over the display window of the device as shown in FIG. 1. Whereby the user can manipulate the magnification lens by means of tabs attached to the frame of the magnification lens until visual clarity has been achieved. It should be also noted that because the magnification lens is adjustable. The device upon which the magnification apparatus is attached can be adjusted to visual clarity for a plurality of user.

Turning to FIG. 2, shown therein is a perspective view of the present invention 10 semi-permanently positioned over the display window 14 of the device 12 as shown in FIG. 1 whereby the user 16 can manipulate the magnification lens 22 by means of tabs 18 attached to the frame 20 of the magnification lens 22 until the object has been brought into focus in the standard manner as shown by direction arrow 15. It should be also noted that because the magnification lens 22 is adjustable with respect to the display window 14, the device 12 upon which the magnification apparatus 10 is attached can be adjusted to visual clarity for a plurality of users 16.

Figure 3:
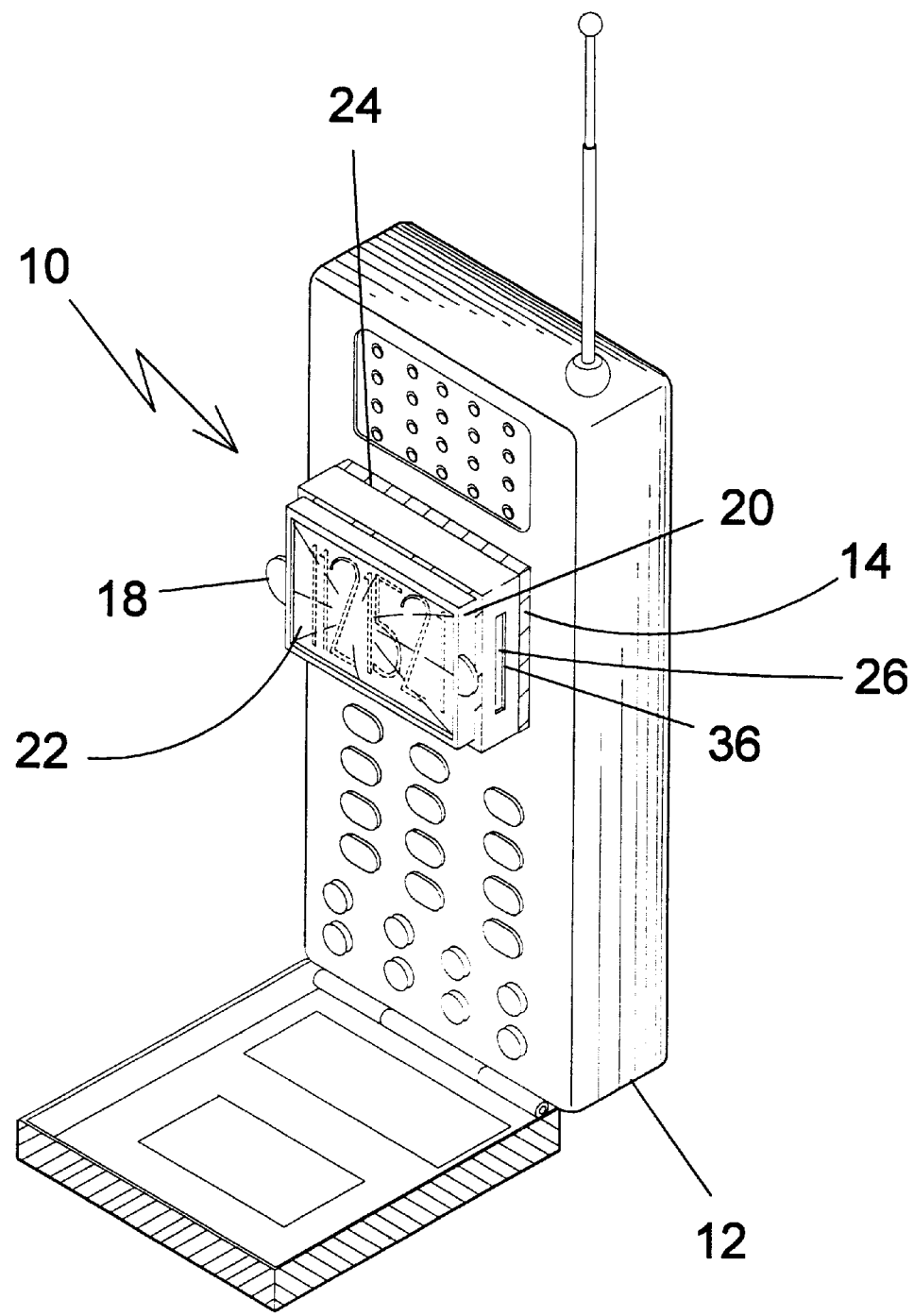
FIG. 3 is a perspective view of a typical cellular telephone unit with power lens of the present invention adhesively adapted to the display window of the cellular phone. Also shown are the lens tabs in which provide a means of orientating the magnifying lens in a space relationship between the users visual optic clarity and object of magnification. Also illustrated is an alternate attachment port in which an elastic strap may be incorporated rather than the use of adhesive.

Turning to FIG. 3, shown therein is a perspective view of a typical cellular telephone unit 12 with the power lens 22 of the present invention 10 adhesively 24 adapted to the display window 14 of the cellular phone 12. Also shown are the lens tabs 18 which provide a means of adjusting the housing 20 holding the magnifying lens 22 in a spaced relationship between the point of the user's visual optic clarity and object of magnification in order to optically focus the object. Also illustrated is an alternate attachment slot 26 in which an elastic strap system 36 may be incorporated rather than the use of adhesive 24.

Figure 4:
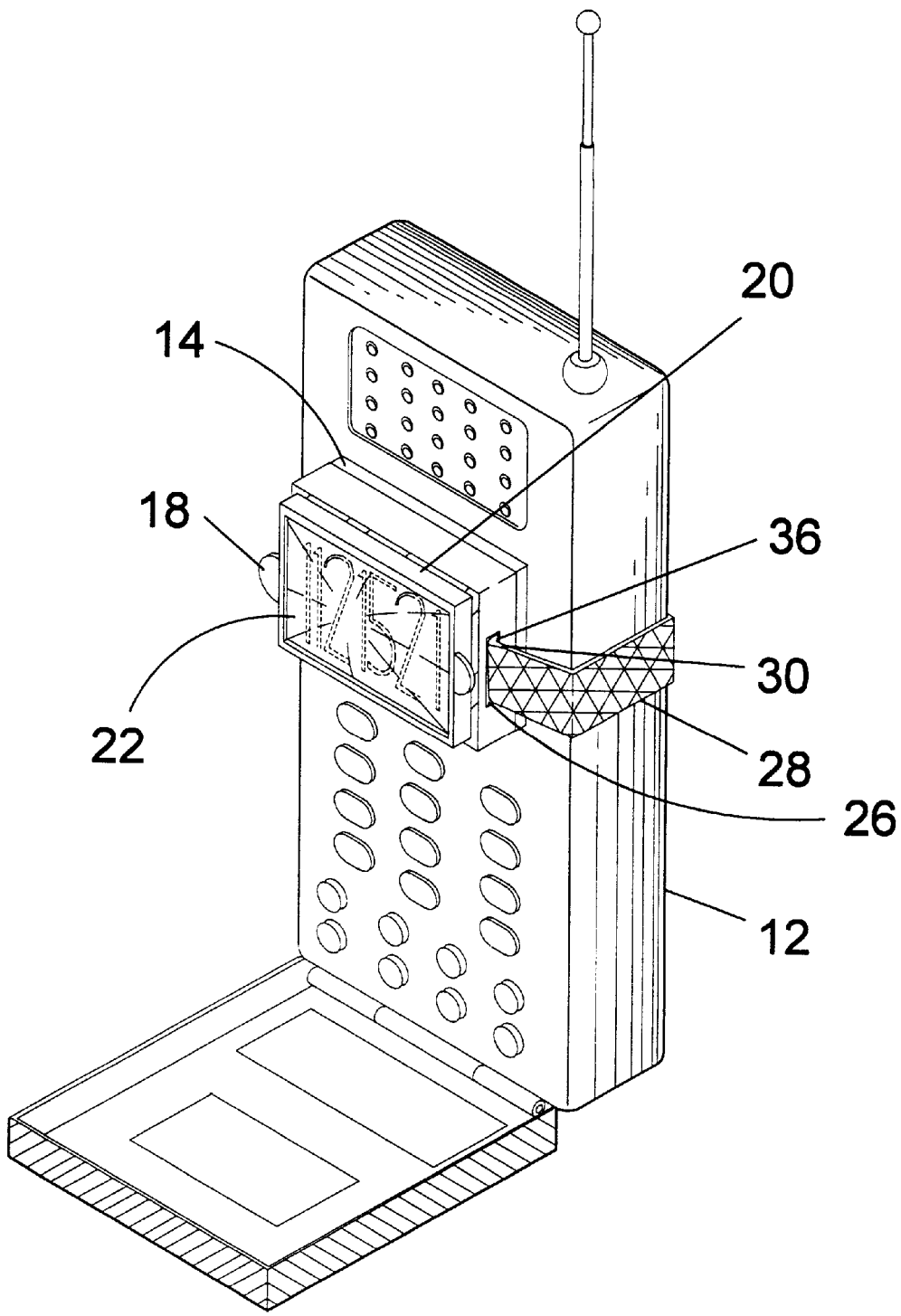
FIG. 4 is a perspective view of a typical cellular phone unit with the power lens of the present invention adapted to the display window by means of a strap system. The strap system is an alternate means of adapting the power lens in place of adhesive. Also shown are the lens tabs in which provide a means of orientating the magnifying lens in a space relationship between the users visual optic clarity and object of magnification.

Turning to FIG. 4, shown therein is a perspective view of a typical cellular phone 12 unit with the power lens 22 of the present invention 10 adapted to the display window 14 by means of a strap system 36. The strap system 36, with slot 26, strap 28 and clip 30 is an alternate means of adapting the power lens 22 in place of adhesive. Also shown are the lens tabs 18 which provide a means of orientating the magnifying lens 22 in a spaced relationship between the user's visual optic clarity and object of magnification.

Figure 5:
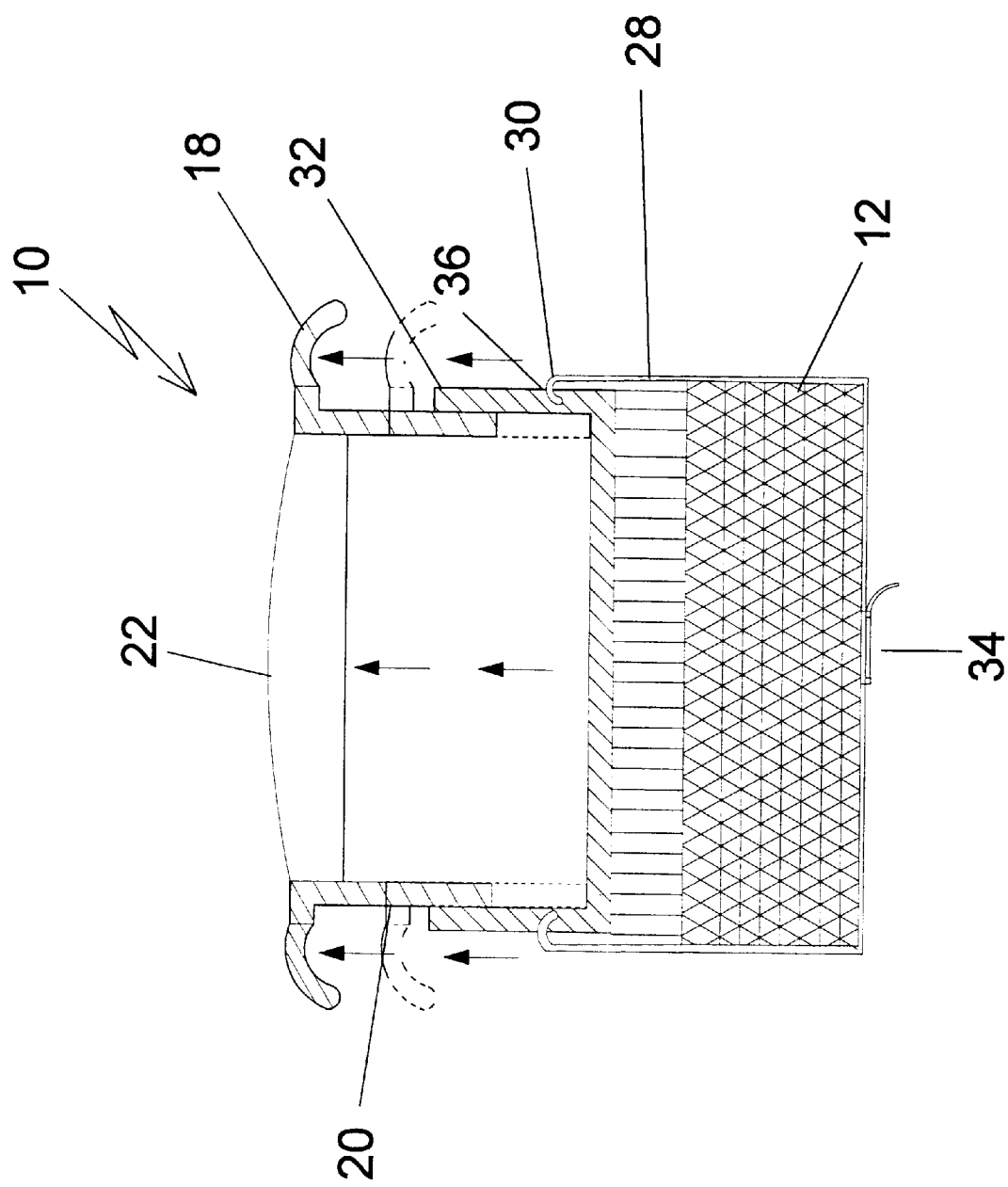
FIG. 5 is a sectional view of the present invention showing the lens and adjustable extension frame in its upmost position. The lens tabs shown provide a means of orientating the magnifying lens in a space relationship between the users visual optic clarity and object of magnification. Also shown, the power lens base mounted to a cellular phone by means of an elastic strap system. The elastic strap system consists of the strap, a clip and a pass thru buckle.

Turning to FIG. 5, shown therein is a sectional view of the present invention 10 showing the lens 22 internal of frame 20 with adjustable extension frame 20 in its upmost position. The lens tabs 18 shown provide a means of adjusting the magnifying lens in a spaced relationship between the user's visual optic clarity and object of magnification. The frame 20 is disposed internal of cup-like base 32 which is mounted to a cellular phone 12 by means of an elastic strap system 36. Base 32 is open on its top and bottom and frame 20 is slidably adjustable and frictionally held therein. The elastic strap system 36 consists of the strap 28, a clip 30 and a pass thru buckle 34. Note that base 32 forms a female-like member for receiving the frame 20 which is male-like.

Figure 6:
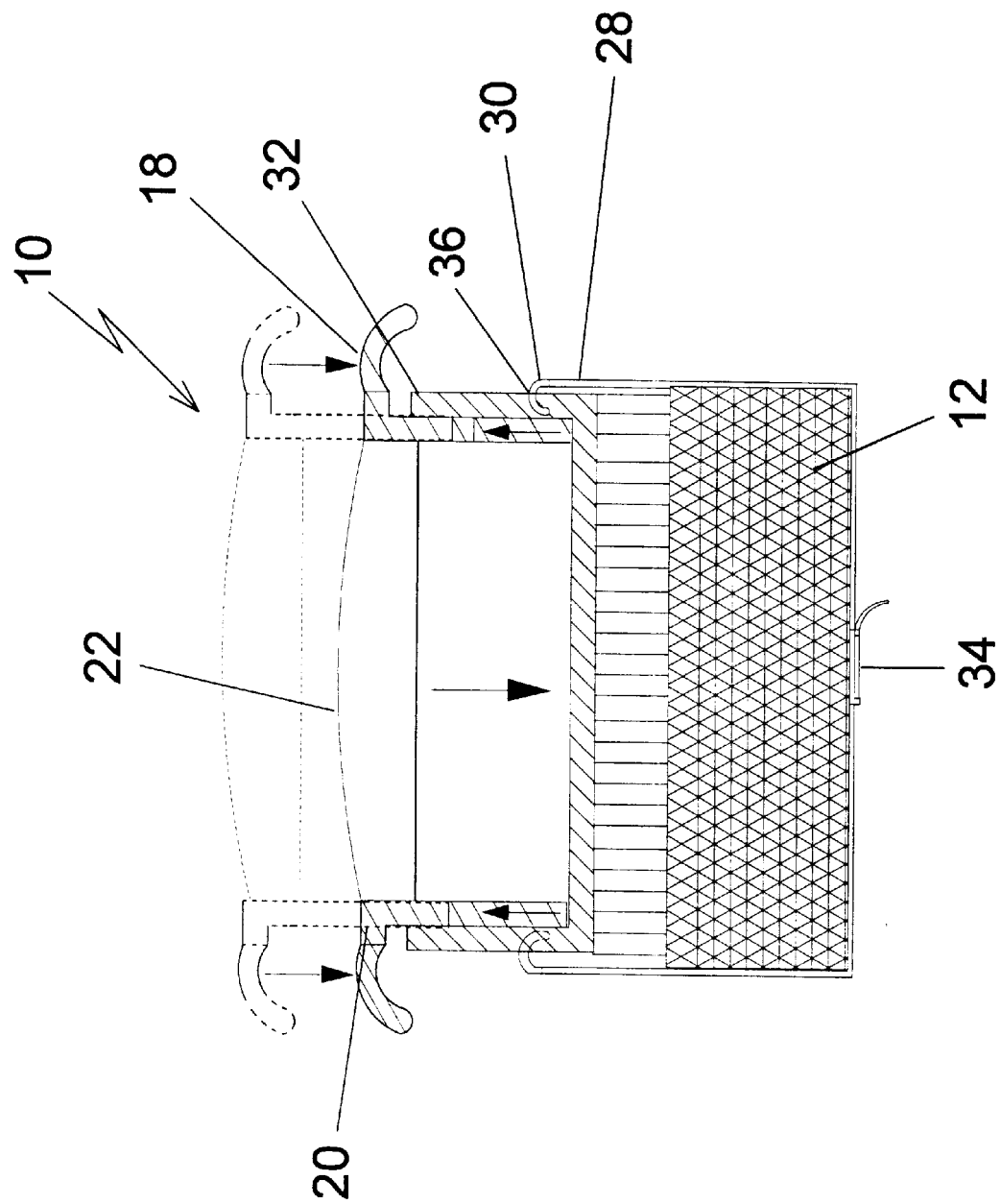
FIG. 6 is a sectional view of the present invention showing the lens and adjustable extension frame in its down most position. The lens tabs shown provide a means of orientating the magnifying lens in a space relationship between the users optic clarity and object of magnification. Also shown the power lens base mounted to a cellular phone by means of an elastic strap system. The elastic strap system consists of the strap, clip and pass thru buckle.

Turning to FIG. 6, shown therein is a sectional view of the present invention 10 showing the lens 22 and adjustable extension frame 20 in its down most position. The lens tabs 18 shown provide a means of orientating the magnifying lens 22 in a spaced relationship between the user's optic clarity and object of magnification. Also shown is the power lens base 32 mounted to a cellular phone 12 by means of an elastic strap system 36. The elastic strap system 36 consists of the strap 28, clip 30 and pass thru buckle 34.

Figure 7:
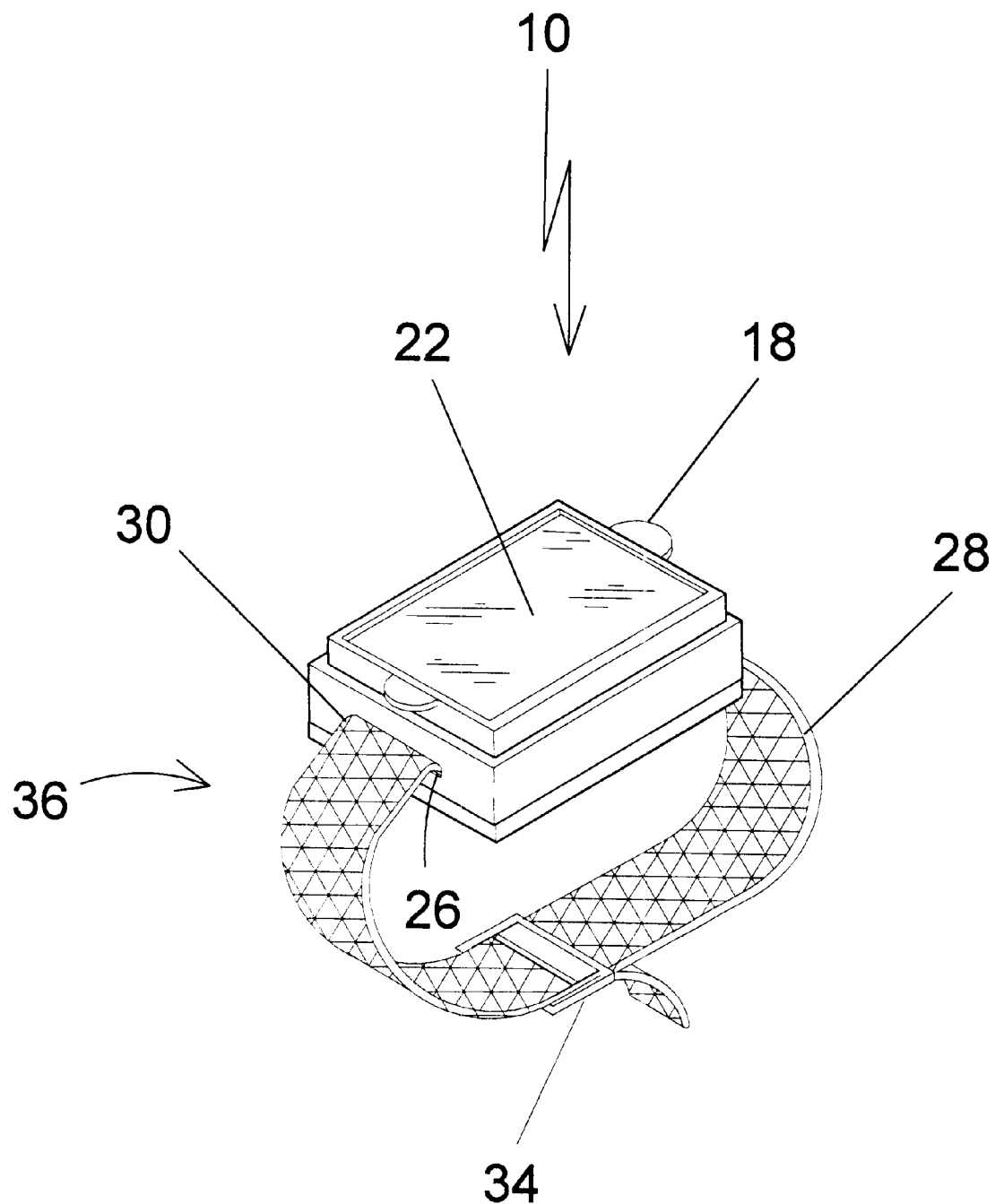
FIG. 7 is a perspective view of the present invention with elastic strap system attached to the two provided mounting ports. Also illustrated are the lens tabs in which provide means of orientating the magnifying lens in spaced relationship between the users visual optic clarity and the object of magnification.

Turning to FIG. 7, shown therein is a perspective view of the present invention 10 with elastic strap system 36 attached to the two provided mounting slots 26 which receive clips 30 which are attached to the ends of straps 28. Also illustrated are the lens tabs 18 which provide means of orientating the magnifying lens 22 in spaced relationship between the users visual optic clarity and the object of magnification. Elements previously disclosed are also shown.

Figure 8:
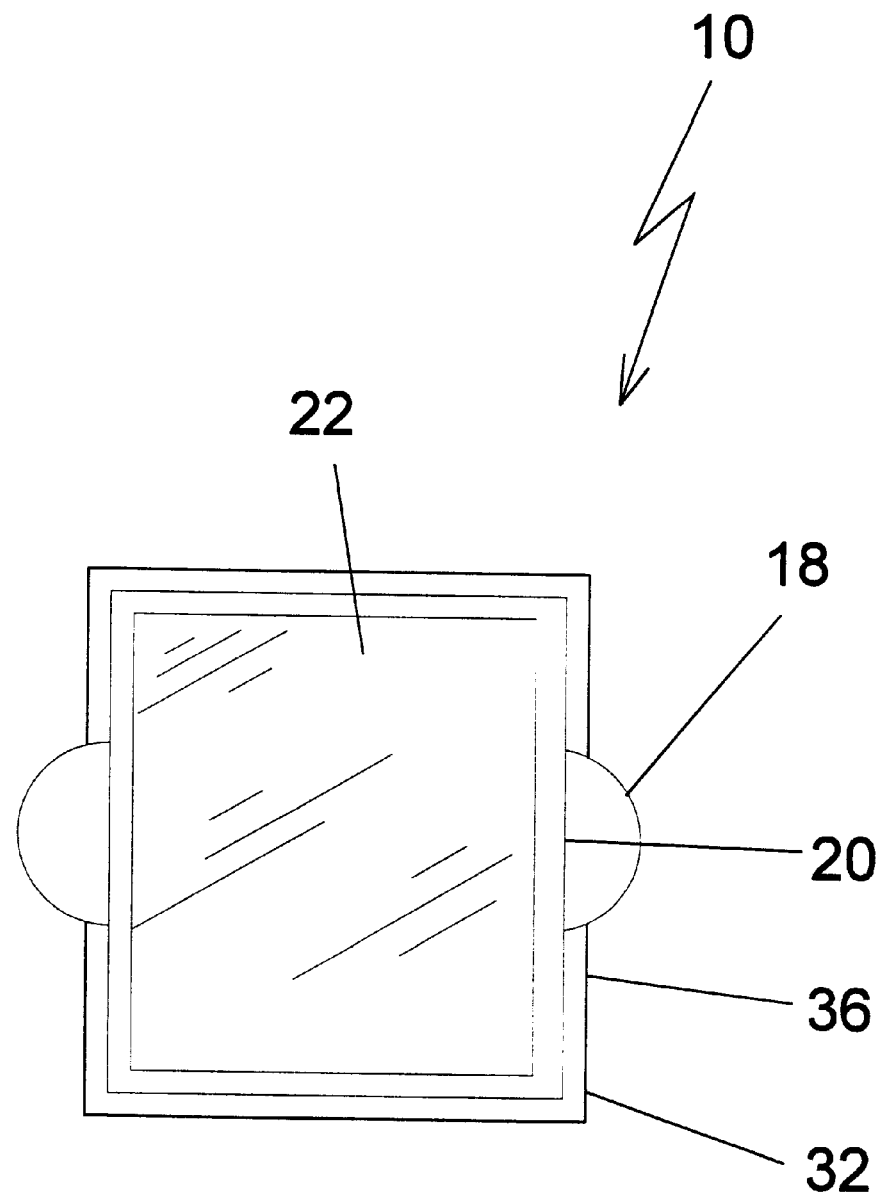
FIG. 8 is a top view of the present invention. Shown, the magnification power lens apparatus in which attaches to the display window of cellular phones, beepers, cordless phones and or any display window that is difficult to read. The embodiment, a housing containing an adjustable extension housing and a magnifying lens. Also shown, the lens tabs in which provide a means of orientating the magnifying lens in a spaced relationship between the users visual optic clarity and object of magnification.

Turning to FIG. 8, shown therein is a top view of the present invention 10. Shown is the magnification power lens apparatus 10 which attaches to the display window of cellular phones, beepers, cordless phones and or any display window that is difficult to read. Shown in this embodiment is a housing 20 being an adjustable extension housing and a magnifying lens 22. Also shown are the lens tabs 18 which provide a means of orientating the magnifying lens 22 in a spaced relationship between the users visual optic clarity and object of magnification. Elements previously disclosed are shown.

Figure 9:
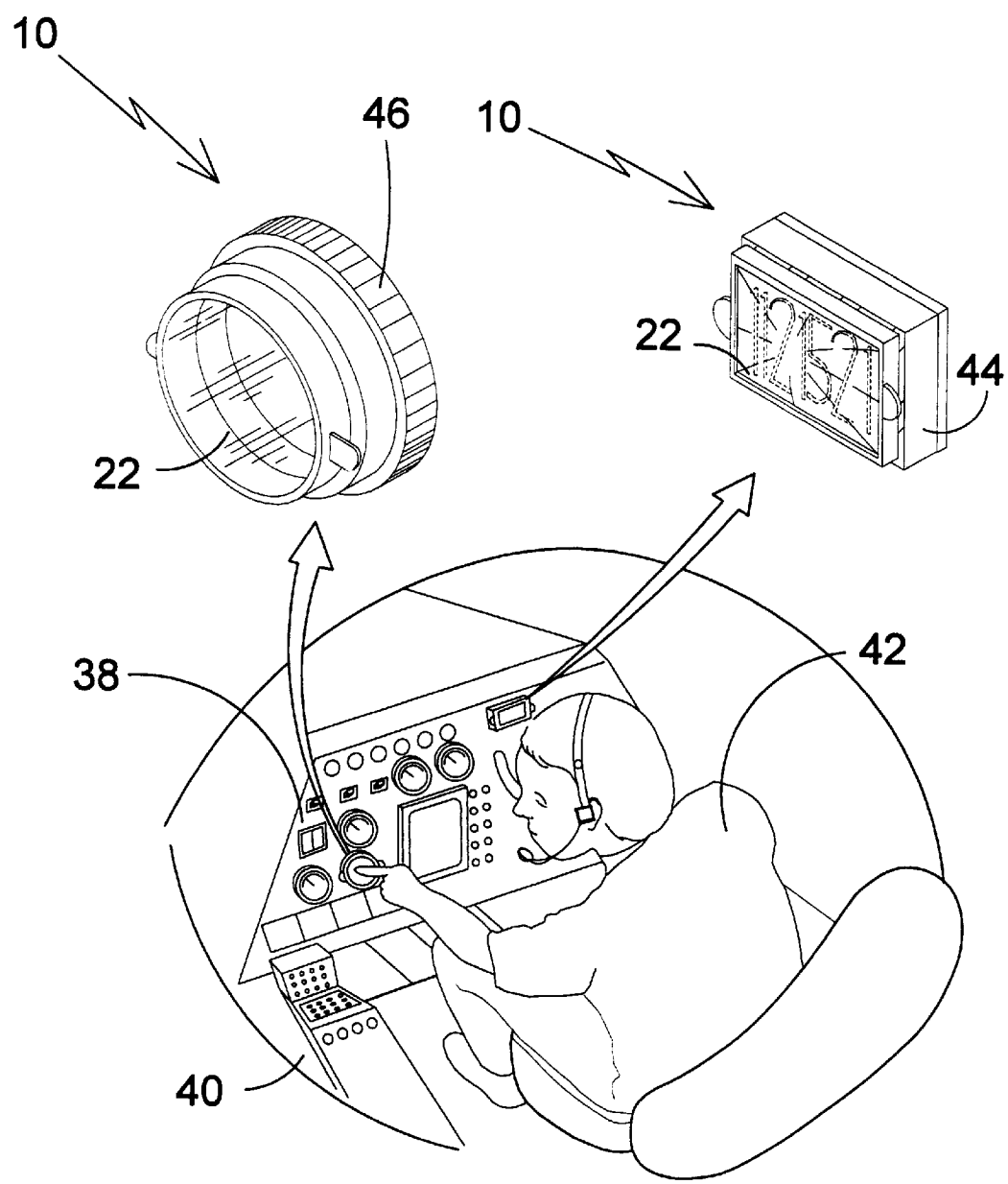
FIG. 9 is a perspective view of an aircraft instrument panel having the present invention adhesively installed thereon. Shown is an instrument panel having a plurality of magnification devices installed thereon. Each of the magnification devices can be individually adjusted for display enlargement purposes. Also, shown are typical type of housings which can be used for the present invention.

Turning to FIG. 9, shown therein is a perspective view of an aircraft 40 instrument panel 38 and pilot 42 having the present invention 10 adhesively installed thereon. Shown is an instrument panel 38 having a plurality of magnification devices 10 installed thereon. Each of the magnification devices 10 with lens 22 can be individually adjusted for display enlargement purposes. Also shown are typical types of housings which can be used for the present invention 10 which can be square 44 or round 46 shaped.

Figure 10:
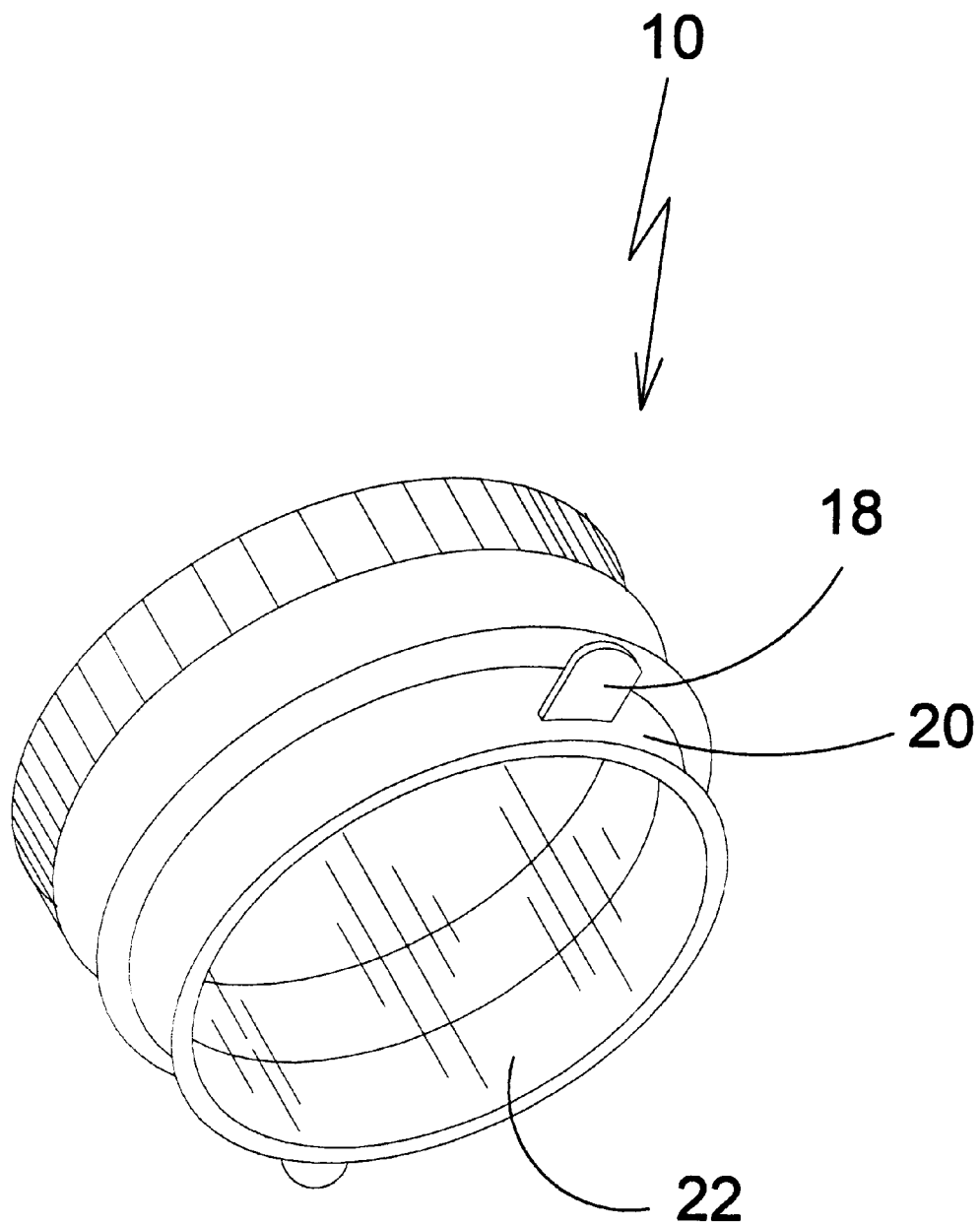
FIG. 10 is an enlarged perspective view of a magnification device as shown in FIG. 9 having a housing adhesively attached to a typical instrument panel gauge found in an airplane. The magnification device can be selectively adjusted for display enlargement purposes by moving the lens housing by means of the lens tabs.

Turning to FIG. 10, shown therein is an enlarged perspective view of a magnification device 10 as shown in FIG. 9 having a housing 20 adhesively attached to a typical instrument panel gauge found in an airplane. The magnification device 10 can be selectively adjusted for display enlargement purposes by moving the lens housing 20 by means of the lens tabs 18. Elements previously disclosed are also shown.

Figure 11:
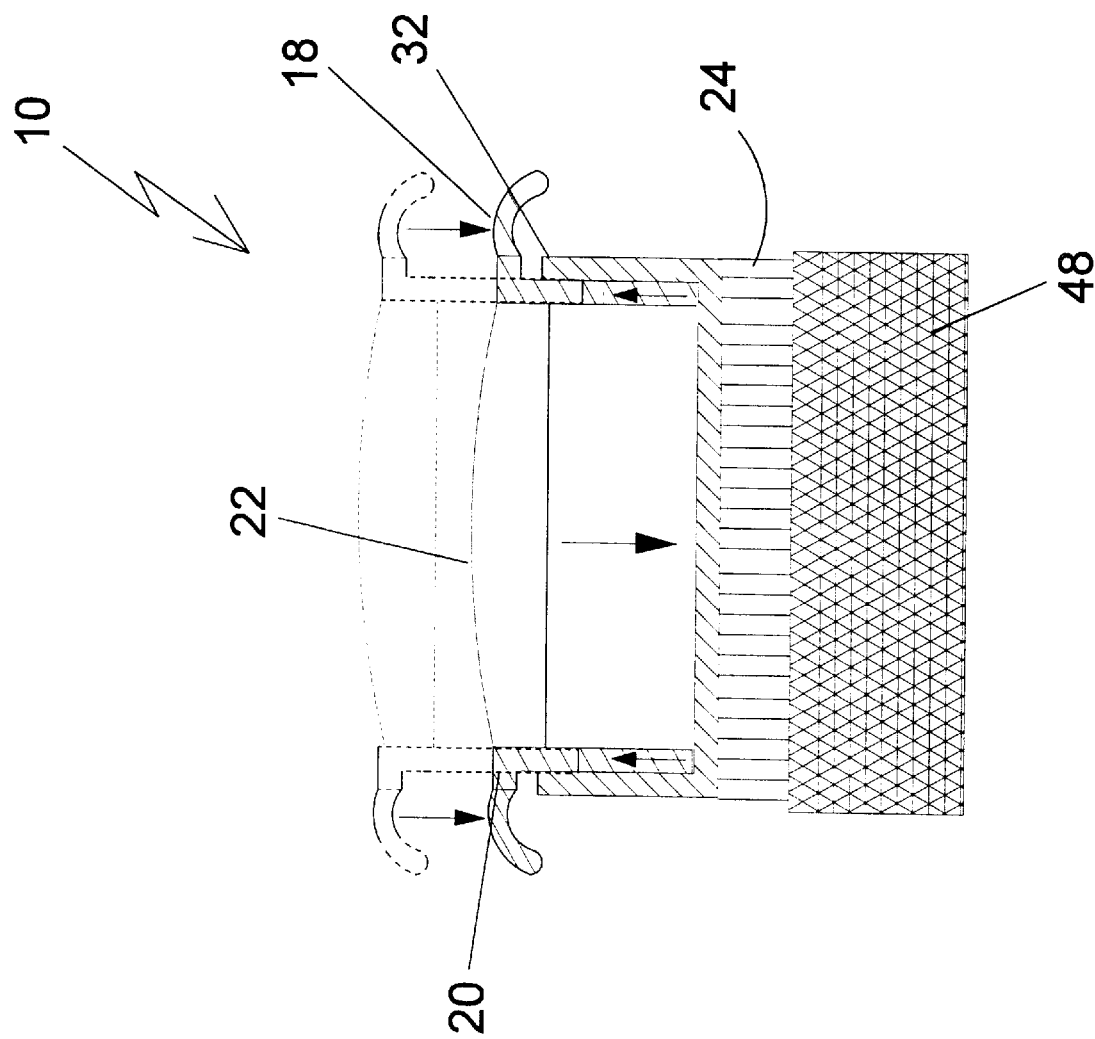
FIG. 11 is an enlarged side sectional view of a magnification device as shown in FIG. 9 having a housing adhesively attached to a typical instrument panel gauge found in an airplane. The magnification device can be selectively adjusted for display enlargement purposes by moving the lens housing by means of the lens tabs.

Turning to FIG. 11, shown therein is an enlarged side sectional view of a magnification device 10 as shown in FIG. 9 having a housing 20 adhesively 24 attached to a typical instrument panel gauge 48 found in an airplane. The magnification device 10 can be selectively adjusted for display enlargement purposes by moving the lens housing 20 by means of the lens tabs 18. The lens 22 and base 32 are also shown.

Figure 12:
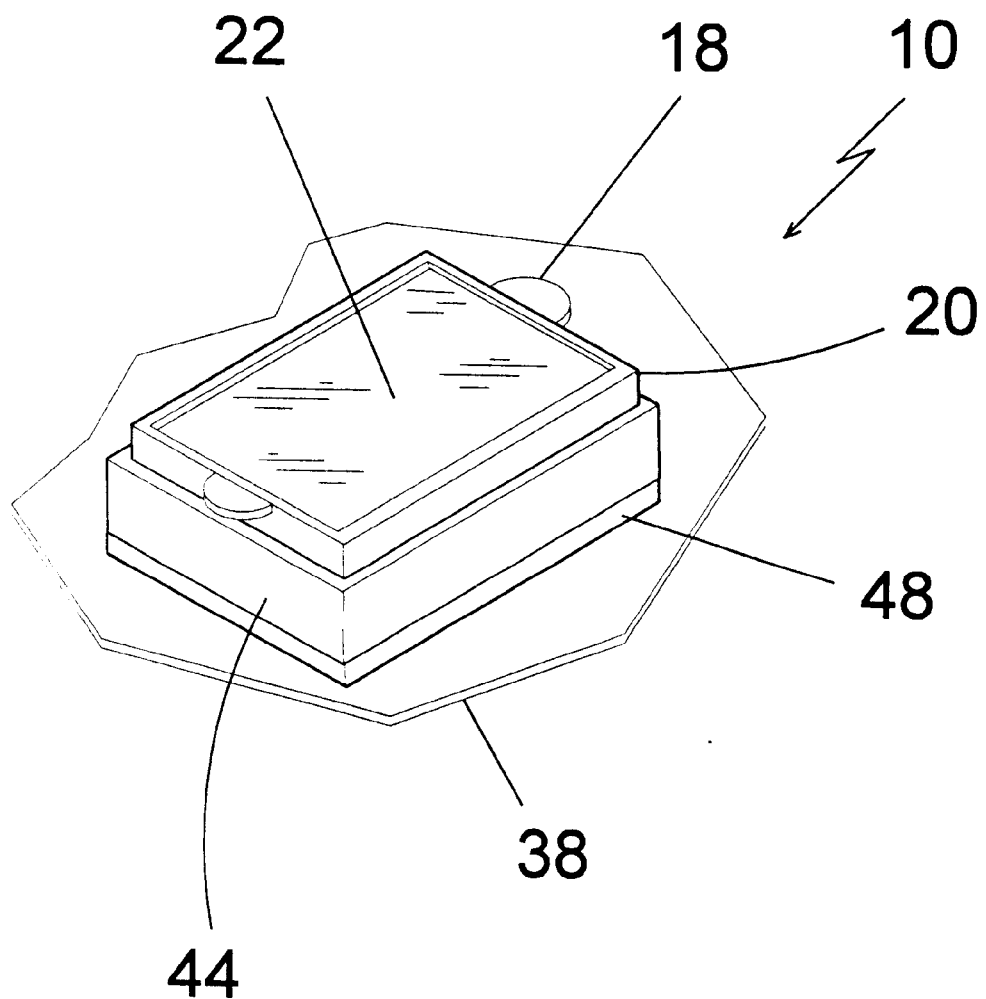
FIG. 12 is an enlarged perspective view of a magnification device having a square housing adhesively attached to a typical instrument panel gauge found in an airplane. The magnification device can be selectively adjusted for display enlargement purposes by moving the lens housing by means of the lens tabs.

Turing to FIG. 12, shown therein is an enlarged perspective view of a magnification device 10 having a square base 44 adhesively attached to a typical instrument panel 38 gauge 48 found in an airplane. The magnification device 10 can be selectively adjusted for display enlargement purposes by slidably moving the lens housing 20 with lens 22 by means of the lens tabs 18.

What is claimed to be new and desired to be protected by Letters Patent is set forth in the appended claims.

I claim:

1. An apparatus for magnifying the display window of a device, comprising:

a) cup-like base member open on its top and open to the passage of light on its bottom;

b) a frame member frictionally mounted internally of said base member, said frame member being a male member for insertion into said base member and said base member being a female member;

c) a magnifying lens disposed internal of said frame member;

d) said frame member telescopically received by the base member and having means for sliding adjustment internally of said base member whereby the display window can be brought into focus by the user, said sliding adjustment means comprising a pair of arched tabs disposed on opposite sides of said frame member; and e) adhesive means for attaching said base member directly to the device whereby the display window is at least partially viewable therethrough display window.

2. The apparatus of claim 1, said base member being complementarily shaped as the display window.

3. The apparatus of claim 2, wherein said base member is round shaped.

4. The apparatus of claim 2, wherein said base member is square shaped.

5. The apparatus of claim 1, said frame member further comprising means for being slidably adjusted internal said base member.

6. The apparatus of claim 5, said frame member being frictionally mounted internal said base member.

7. The apparatus of claim 6, said frame member being a male member for insertion into said base member, said base member being a female member.

8. The apparatus of claim 1, said means for adjustment further comprising at least one tab disposed on said frame member.

9. The apparatus of claim 1, said means for adjustment further comprising a pair of tabs disposed on said frame member.

10. The apparatus of claim 1, said means for attaching further comprising adhesive.

11. The apparatus of claim 1, said means for attaching further comprising a strap system.

12. The apparatus of claim 11, said base member having a pair of slots therein, said slots for receiving a pair of clips wherein each said slot receives a clip.

13. The apparatus of claim 12, said slots disposed in the wall of said base member, said slots further receiving a pair of clips wherein each said slot receives a clip.

14. The apparatus of claim 13, said pair of clips wherein a first clip is disposed on a first strap end and a second clip is disposed on a second strap end.

15. The apparatus of claim 14, said first strap end and said second strap end connected by a means for buckling.

16. The apparatus of claim 15, said means for buckling further comprises a pass through buckle.

* * * * *